(12) United States Patent
Patel

(10) Patent No.: US 6,856,033 B2
(45) Date of Patent: Feb. 15, 2005

(54) ENERGY CONVERSION SYSTEM

(76) Inventor: Bhanuprasad Patel, 5118 Simmons Branch Trail, Raleigh, NC (US) 27606

( * ) Notice: Subject to any disclaimer, the term of this patent is extended or adjusted under 35 U.S.C. 154(b) by 223 days.

(21) Appl. No.: 10/293,459

(22) Filed: Nov. 13, 2002

(65) Prior Publication Data

US 2003/0102841 A1 Jun. 5, 2003

Related U.S. Application Data

(63) Continuation-in-part of application No. 09/733,175, filed on Dec. 8, 2000, now abandoned.

(51) Int. Cl.[7] .................... F01C 13/00; F01D 15/10; F02M 11/06; H02P 9/04
(52) U.S. Cl. ................. 290/40 C; 290/4 R; 290/40 R
(58) Field of Search .................. 290/40 C, 4 R, 290/40 R; 320/101; 180/65.2

(56) References Cited

U.S. PATENT DOCUMENTS

| 4,043,126 A | * | 8/1977 | Santos .................... 60/407 |
| 4,229,661 A | * | 10/1980 | Mead et al. .............. 290/44 |
| 4,345,160 A | * | 8/1982 | Smith ...................... 290/52 |
| 4,653,601 A | * | 3/1987 | Nakamura et al. ........ 180/446 |
| 4,843,250 A | * | 6/1989 | Stupakis ................... 290/53 |
| 4,951,769 A | * | 8/1990 | Kawamura ............... 180/65.4 |
| 5,283,470 A | * | 2/1994 | Hadley et al. ............ 290/45 |
| 5,296,799 A | * | 3/1994 | Davis ....................... 322/35 |
| 6,051,892 A | * | 4/2000 | Toal, Sr. ................... 290/43 |
| 6,373,145 B1 | * | 4/2002 | Hamrick .................. 290/44 |

FOREIGN PATENT DOCUMENTS

WO    WO 01/43272 A1   *   6/2004

* cited by examiner

*Primary Examiner*—Joe Waks
*Assistant Examiner*—Julio Gonzalez R.
(74) *Attorney, Agent, or Firm*—Coats & Bennett, P.L.L.C.

(57) ABSTRACT

An energy conversion system including a bank of batteries operative to drive a DC motor through a controller. The DC motor is in turn connected to a gearbox, which is in turn is connected to a work piece. Further, there is provided a rotary fluid drive that is powered by a pump that is driven by the one or more batteries. The output of the rotary powered device is directed to a DC generator. The DC generator is driven by the rotary powered device. Output from the DC generator is directed to a battery charger for powering the same. The battery charger is in turn utilized to charge the one or more batteries. Finally, there is provided an external source of power that is capable of delivering power to the bank of batteries on demand.

13 Claims, 5 Drawing Sheets

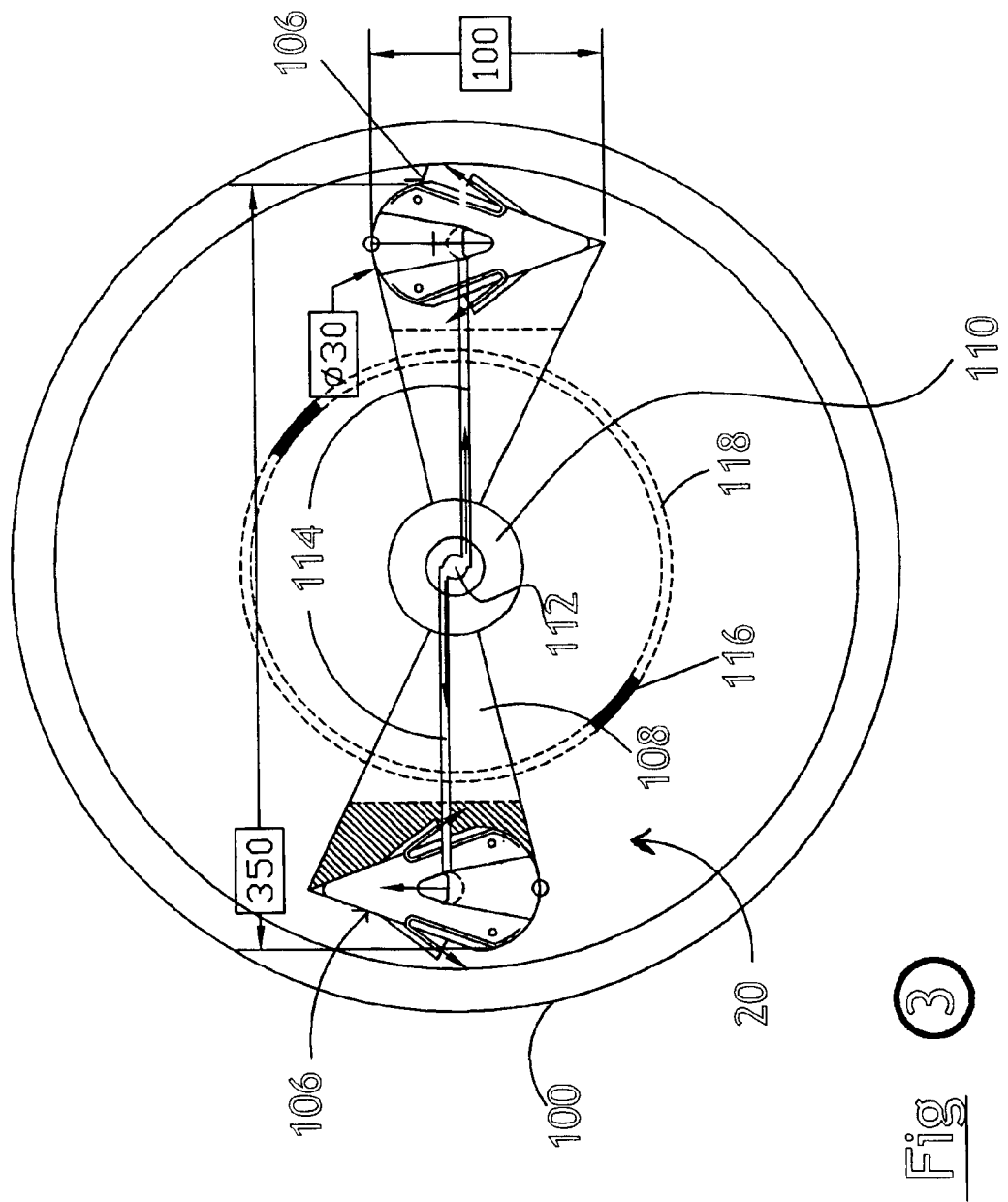

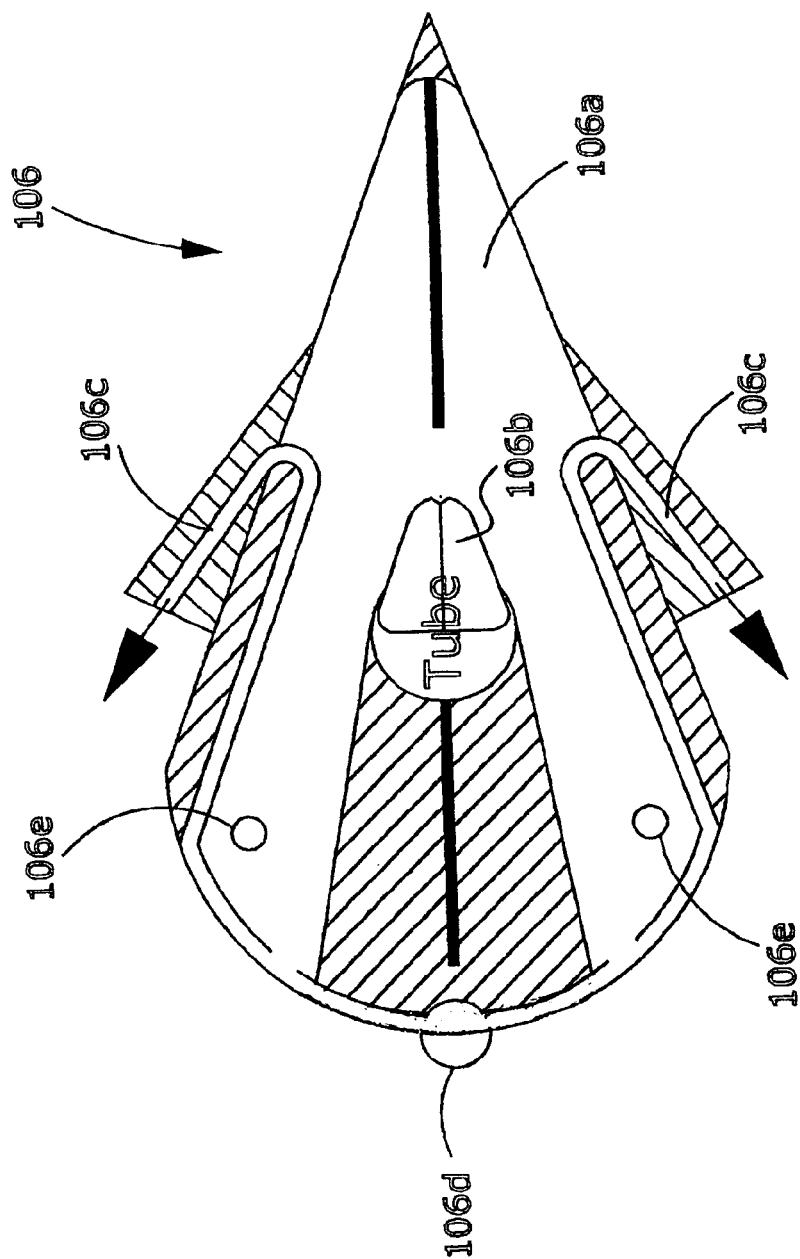

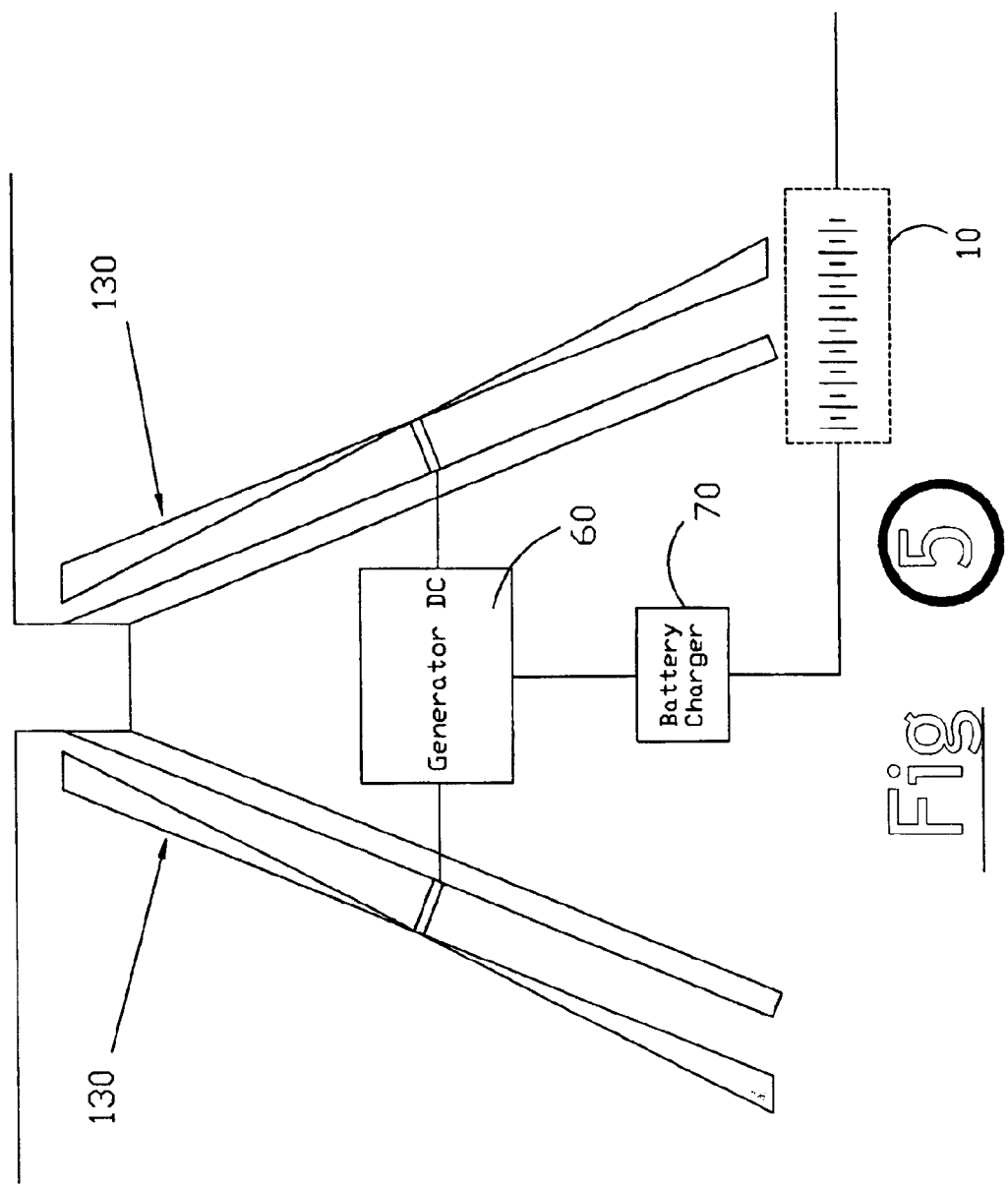

US 6,856,033 B2

ENERGY CONVERSION SYSTEM

CROSS REFERENCE TO RELATED APPLICATION

This is a continuation-in-part of U.S. patent application Ser. No. 09/733,175 filed on Dec. 8, 2000 now abandoned.

SUMMARY OF THE INVENTION

The present invention relates to an energy conversion system that is utilized to convert the energy from a bank of batteries to a form of energy that can be utilized by a work piece such as a gear assembly or a wheel and axel assembly. Basically, the energy conversion system includes one or more batteries connected in series. The output voltage of the batteries is directed to a controller, which is in turn operatively connected to a DC motor. The controller effectively controls the speed of the DC motor. The DC motor in turn is connected to a gearbox, which, in turn, may be connected to a work piece such as a wheel and axel assembly.

The energy conversion system of the present invention also includes a DC generator. The DC generator is operatively connected to a battery charger for powering the same and the battery charger is in turn connected to the one or more batteries for recharging the batteries.

In one embodiment, there may be provided a rotary fluid drive operatively connected between the one or more batteries (or another battery) and the DC generator. In such an embodiment, the power outputted by the one or more batteries or the battery charger is utilized to drive a fluid pump which in turn drives a rotor or rotary assembly. The output of the rotary assembly is directed to the DC generator and functions to drive the same.

The present invention also entails an external power source that may be in various forms. The external power source is coupled to the one or more batteries for continuously or on demand for providing energy or power to recharge the one or more batteries.

BRIEF DESCRIPTION OF THE DRAWINGS

FIG. 3 is a schematic illustration of the rotary fluid drive that forms a part of the energy conversion system.

FIG. 4 is a schematic sectional view showing the structure of one head of the rotary fluid drive.

FIG. 5 is a schematic illustration of a fan system that could be incorporated into the present invention.

DESCRIPTION OF EXEMPLARY EMBODIMENT OF THE INVENTION

Figure 1:
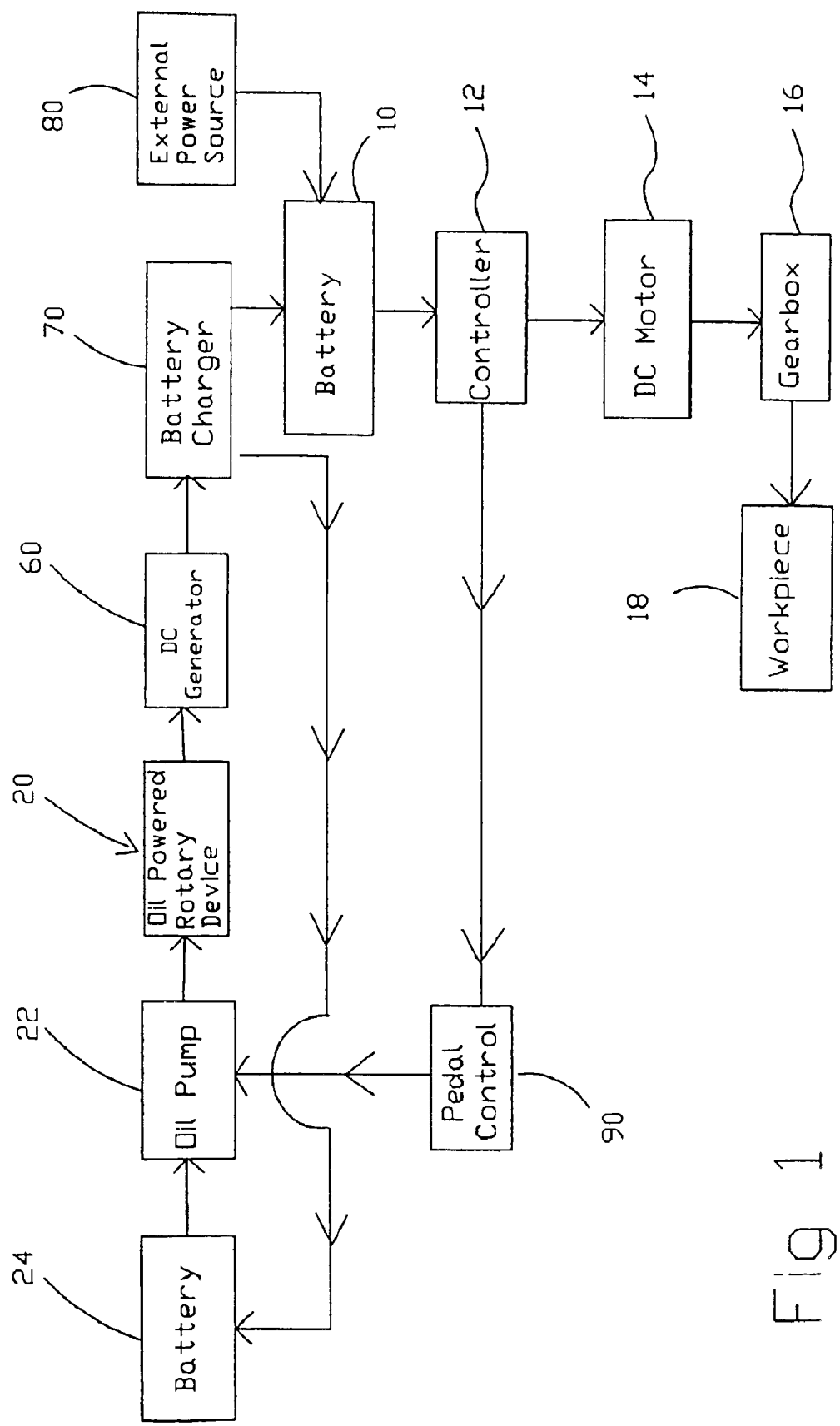
FIG. 1 is a schematic illustration of the energy conversion system of the present invention.

With further reference to the drawings, particularly FIG. 1, the energy conversion system of the present invention is schematically shown therein. The energy conversion system includes one or more batteries 10. In one embodiment, this includes eight 12-volt batteries connected in series.

The bank of batteries 10 is in turn connected to a controller 12. Controller 12 is connected to a DC motor 14. The controller effectively controls the speed of the DC motor. Details of the controller are not dealt with herein because such is not per se material to the present invention and further, such controllers for controlling the speed of the DC motor are well known and appreciated by those skilled in the art. Controller 12 is of the type manufactured by Zapi Inc. under the model no. H2. The Zapi H2 controller is a microprocessor-based controller for motors.

Figure 2:
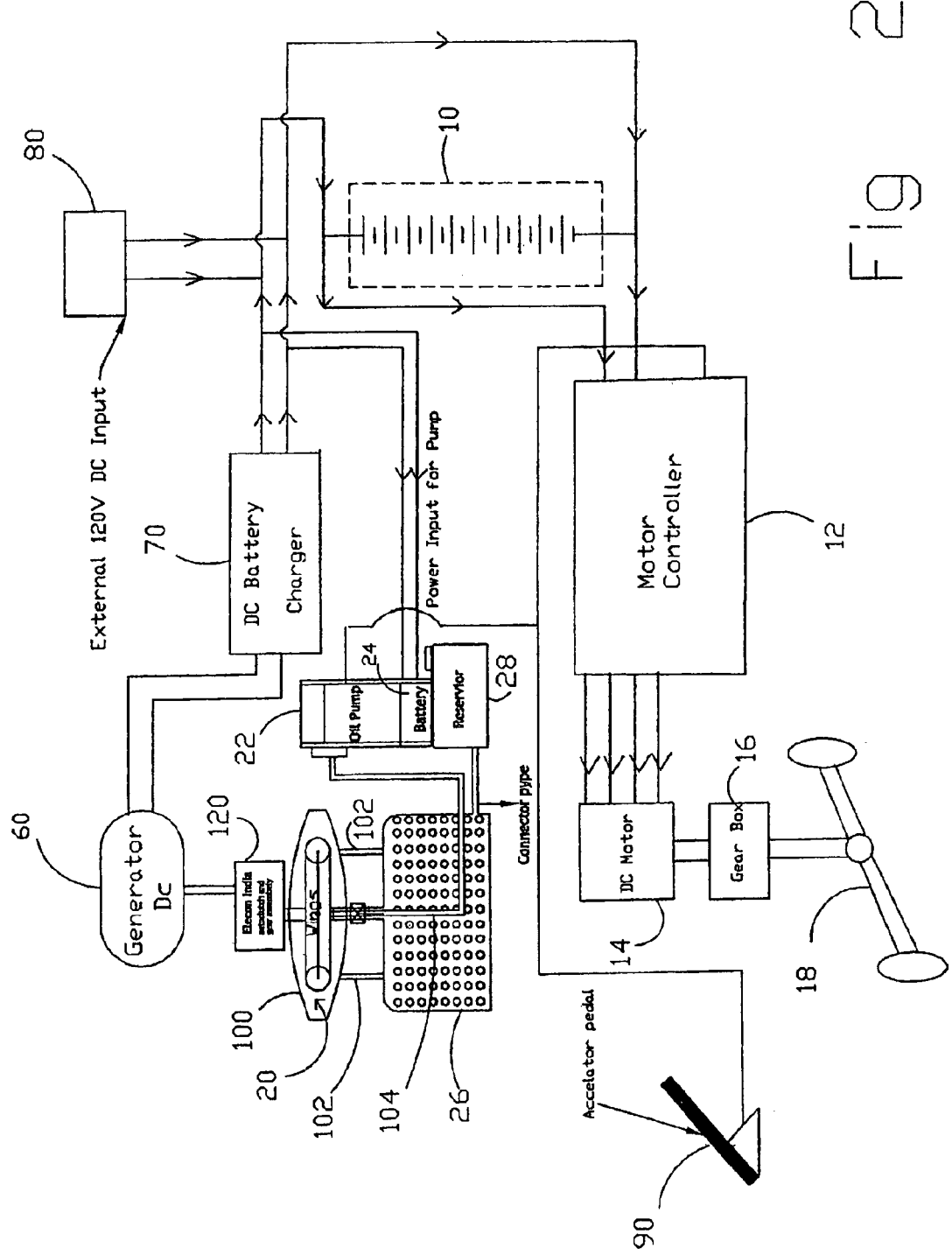
FIG. 2 is a more detailed schematic illustration of the energy conversion system of the present invention.

The DC motor 14 is operatively connected to a gearbox 16. The driving torque associated with the DC motor 14 is transferred to the gearbox 16. The gearbox 16 is in turn operatively connected to a work piece 18. Work piece 18 may assume various forms. In FIG. 2, the work piece 18 is simply a wheel and axel assembly such as found on a vehicle.

There is also provided a rotary power drive. As illustrated in FIG. 1, the rotary power drive includes an oil powered rotary device 20, an oil pump 22 and a battery 24. Battery 24 powers the oil pump 22, which in turn drives the rotary device 20. In the embodiment of FIG. 1, a separate battery or bank of batteries 24 is utilized to drive the oil pump 22. However, it should be appreciated that the battery or bank of batteries 10 could be utilized to drive the oil pump 22. In the embodiment illustrated in FIG. 1, the battery charger 70 is operatively connected to the battery 24 for charging the same. In any event, the rotary fluid drive includes, as seen in FIG. 2, a main tank 26 and a pump reservoir 28. Main tank 26 is adapted to contain and hold oil that is pumped by the oil pump 22 to the rotary device 20. Reservoir 28 is specifically adapted to be interposed between the tank 26 and the oil pump 22. That is, in pumping oil from the tank 26, oil is pumped through the pump reservoir 28, and through the pump into the rotary device 20. Subsequently herein, the rotary fluid drive or rotary device will be discussed further.

The output of the rotary fluid drive is connected to a DC generator 60. Although the size of the DC generator may vary, it is anticipated that in one embodiment, the same would be a 30 horsepower DC generator and would, under certain conditions, turn approximately 4000 rpm.

DC generator 60 is operatively connected to a battery charger 70. The output of the DC generator 60 basically powers the DC battery charger. The battery charger would have a capacity to charge a bank of batteries comprised of eight 12-volt batteries.

In order to supply power to the system just described, there is provided an external power source indicated by the numeral 80. External power source 80 could be in various forms but which would be ultimately adapted to provide DC power to the battery or bank of batteries 10.

To control the energy conversion system shown in FIGS. 1 and 2, there is provided an actuator or control indicated by the numeral 90. In the case of the embodiment shown in FIG. 1, this actuator or control is in the form of a pedal control such as an accelerator. The actuator or control 90 is connected to the controller 12 and to the oil pump 22 which would include an associated motor for driving the same.

Referring back to the rotary fluid drive, as seen in FIG. 2 the rotary fluid drive includes a housing 100. A pair of drain lines 102 extends from the housing 100 to the tank 26. Further, there is provided an inlet line 104 that extends from the oil pump 22 into the housing 100. As will be discussed below, oil pumped by the oil pump 22 is directed into the housing 100 where the oil acts to drive a rotary assembly that is rotatively mounted in the housing 100.

Turning to FIGS. 3 and 4, the rotary drive is shown in schematic form. The rotary drive in this design or embodiment includes a pair of heads, with each head indicated generally by the numeral 106. The heads 106 are mounted on a rotary member 108 that is rotatively mounted with shaft 110. There is provided an oil inlet 112 disposed interiorly of shaft 110. The rotary member 108 supports or includes a pair of feed lines 114 that extend from adjacent the oil inlet 112 into each of the heads 106. There is also provided a bearing wheel 116 and a track 118 for the bearing wheel. The bearing wheel and track enables the heads 106 and the rotary member 108 to turn in a relatively smooth manner.

There is also provided a auto clutch 120 disposed between the rotary fluid drive and the DC generator. Clutch 120 can be of a conventional clutch design and is adapted to control the torque transferred from the rotary fluid drive to the DC generator 60.

Details of the oil inlet 112 and its relationship to the inlet lines 114 are not dealt with here in detail because structures that are capable of supporting the function required here are well known. That is, the oil inlet 112 is capable of supplying oil under pressure from the oil pump 22 continuously around the oil inlet 112. That is, as the rotary member 108 turns, the individual lines 114 leading to the heads remain communicatively connected to the oil inlet 112 such that oil can be passed from the oil inlet into the respective lines 114.

With particular reference to the head 106, attention is directed to FIG. 4. In FIG. 4, the head 106 is shown to include an internal cavity 106a. Cavity 106a is adapted to receive a supply of oil under pressure. That is, the oil in cavity 106a will be at a pressure greater than atmospheric pressure. Disposed generally between the front and rear portions of each head 106 is an inlet 106b that allows oil to be directed into the cavity 106a. There is also provided a pair of outlet ports or orifices 106c. Oil under pressure within the cavity 106a is expelled out these outlet ports 106c in a jet-like fashion. Because of the substantial high pressure of the oil exhausted out of ports 106c, the heads 106 are propelled in a clockwise direction as viewed in FIG. 3. That is, as the oil is expelled out ports 106c, there is backward thrust generated causing the heads 106 to be driven. Further, there is provided a central outlet port or orifice 106d about the rear end of each head. Although not shown, there is an oil channel from the cavity 106a to the central outlet port 106d. Finally, there is provided in the oil cavity 106a two pressure relief valves 106e that permit the release of oil from the cavity 106 in the event of a pressure build-up greater than a pre-determined value. The pump will continue to deliver oil to the head and maintain the oil within the head under a pressure greater than atmospheric pressure. As noted above, when the oil is expelled from the orifices or ports, the velocity will give rise to a backward thrust to the head.

Oil expelled from the heads 106 drain down into the housing 100 and therefrom through the drain lines 102 back to the main tank 26.

In FIG. 5, there is shown a fan-type device that is utilized to convert the energy that results from air impacting a pair of fans 130 as a vehicle moves down the road. In this case, there is shown a pair of fans 130 that are operative to drive the DC generator 60 which in turn powers the battery charger 70. The volume and force of air rotates the fans 130. Further, the volume of air and the force of air which causes the fans to rotate can produce an output energy that can be used to charge the battery. As noted above, battery charger 70 is operatively connected to the one or more batteries referred to by the numeral 10. The energy conversion system is adapted to be incorporated into a vehicle and when incorporated into a vehicle may include one or more fan blades that are driven as the vehicle moves. That is, the volume and force of air rotates the one or more fan blades. The output of the fan blades can be utilized to drive the DC generator which is in turn connected to the one or more batteries of the system.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. An energy conversion system comprising:
   a. one or more batteries;
   b. a DC motor;
   c. a controller operatively connected between the one or more batteries and the DC motor for controlling the speed of the DC motor;
   d. a gear box operatively connected to the DC motor wherein the DC motor drives the gear box;
   e. a work piece operatively connected to and driven by the gear box;
   f. a battery charger operatively connected to the one or more batteries for charging the one or more batteries;
   g. a DC generator operatively connected to the battery charger for powering the battery charger, wherein the DC generator is driven by a rotary assembly that is driven by a fluid medium;
   h. the rotary assembly including at least one head supported on at least one rotating member, wherein fluid is pumped into the head and expelled from the head, resulting in the head being propelled; and
   wherein the head includes a cavity for receiving and holding fluid and wherein during operation fluid is pumped into the cavity of the head such that the pressure therein exceeds atmospheric pressure and wherein the fluid expelled from the head is expelled at a pressure greater than atmospheric pressure.

2. The energy conversion system of claim 1 wherein the work piece includes a wheel and axel assembly that is driven by the gearbox.

3. The energy conversion system of claim 1 wherein the one or more batteries include a bank of batteries connected together in series.

4. The energy conversion system of claim 3 including an external power source.

5. The energy conversion system of claim 4 wherein the external power source is operatively connected to the one or more batteries.

6. The energy conversion system of claim 1 including a pump for pumping fluid into engagement with the rotating assembly.

7. The energy conversion system of claim 1 wherein the pump is operatively connected to a battery that powers the pump.

8. The energy conversion system of claim 1 wherein the rotary assembly includes at least two spaced apart heads secured to the rotary member.

9. The energy conversion system of claim 1 wherein the system is incorporated into a vehicle and includes an external source of power in the form of one or more fan blades that are driven as the vehicle moves.

10. A method of converting energy and driving a work piece comprising:
   a. driving a DC motor with one or more batteries;
   b. controlling the speed of a DC motor with a controller;
   c. directing the output of the DC motor to a gearbox;
   d. directing the output of the gearbox to a work piece and driving the work piece;

e. driving a DC generator and directing the output of the DC generator to a battery charger for providing power for the battery charger;

f. connecting the battery charger to the one or more batteries such that the battery charger is operative to recharge the one or more batteries;

g. driving the DC generator through a rotary fluid drive device;

h. pumping a fluid under pressure into a head that forms a part of the rotary fluid device causing the head to rotate about an axis; and i. maintaining the fluid within the head under pressure and expelling the fluid in the head from one or more ports which causes the head to rotate and produces an output that is directed to the DC generator for driving the DC generator.

11. The method of claim 10 wherein the rotary fluid drive includes a pair of heads secured to a rotating member and wherein the fluid directed to the rotary drive includes an oil that is directed into the heads and expelled, under pressure, from the heads.

12. The method of converting energy and driving a work piece of claim 10 including providing power to the rotary fluid drive via one or more batteries.

13. The method of converting energy of claim 10 including directing power from an external power source to the one or more batteries.

\* \* \* \* \*